United States Patent [19]
Licht et al.

[11] 3,795,427
[45] Mar. 5, 1974

[54] ANTI-WHIRL FLUID BEARING

[75] Inventors: Lazar Licht, San Mateo; Moritz Branger, Los Altos; Helmut L. Kayan; Bob L. Lawson, both of Redwood City, all of Calif.

[73] Assignee: Ampex Corporation, Redwood City, Calif.

[22] Filed: Nov. 24, 1972

[21] Appl. No.: 309,196

[52] U.S. Cl. .................................................. 308/9
[51] Int. Cl. .......................................... F16c 17/16
[58] Field of Search .................................... 308/9, 1

[56] References Cited
FOREIGN PATENTS OR APPLICATIONS
1,454,024 10/1966 France ................................. 308/9

*Primary Examiner*—Charles J. Myhre
*Assistant Examiner*—Frank Susko

[57] ABSTRACT

An anti-whirl capability is provided for a shaft and journal bearing, or a conical-ended shaft in a combination journal-thrust bearing, by coiling a springy foil-strip in more than one full turn around the shaft within the bearing concavity, the springiness of the coiled strip being such as to cause the coil to expand away from the shaft and against the walls of the concavity in the bearing block.

17 Claims, 19 Drawing Figures

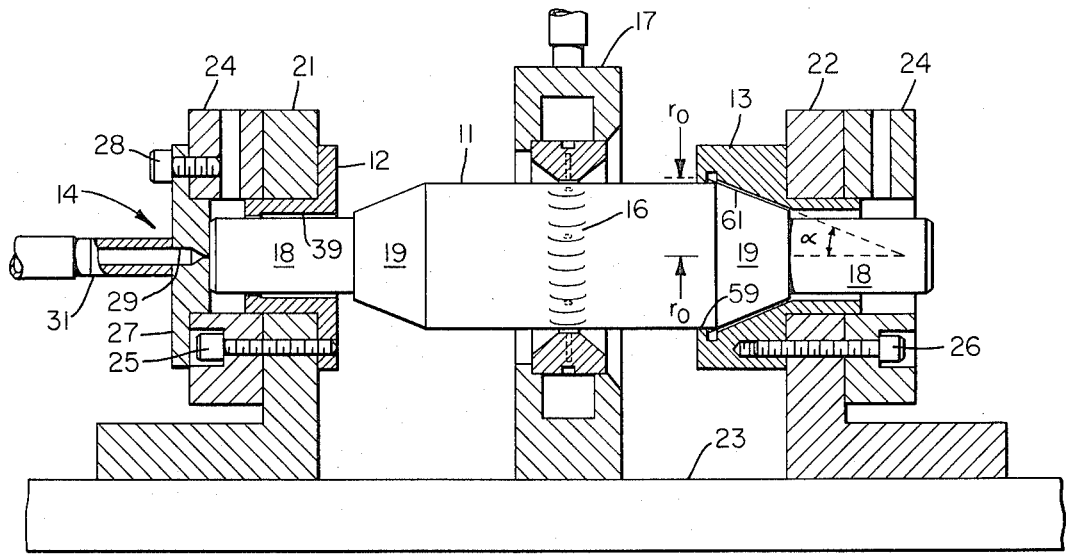
FIG_1
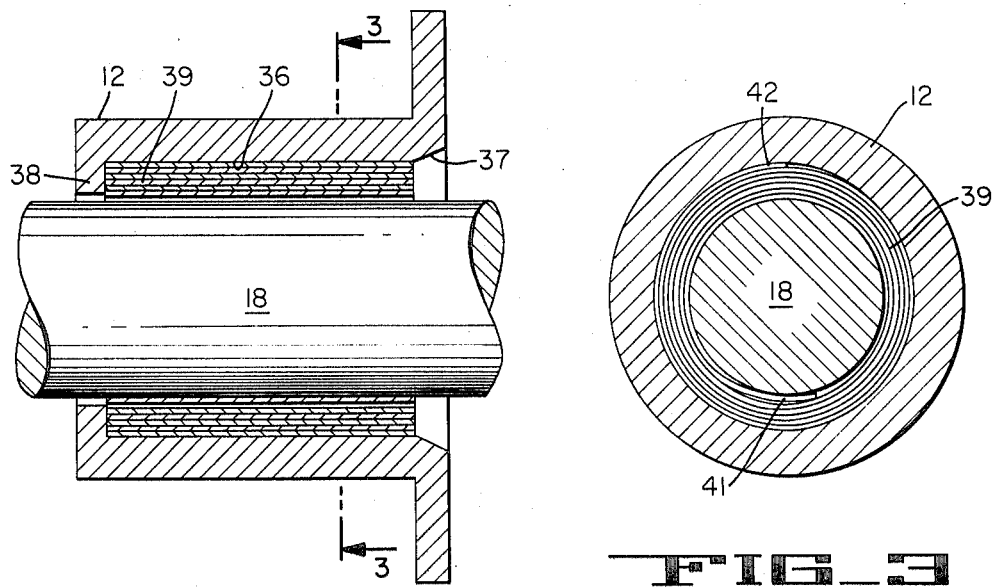
FIG_2
FIG_3

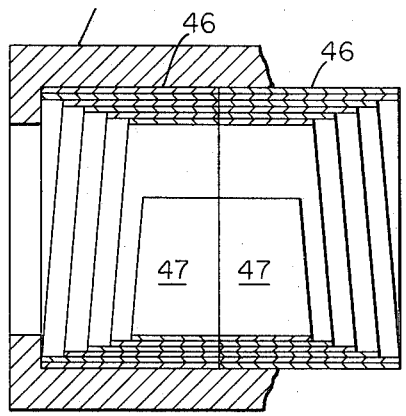
FIG_4
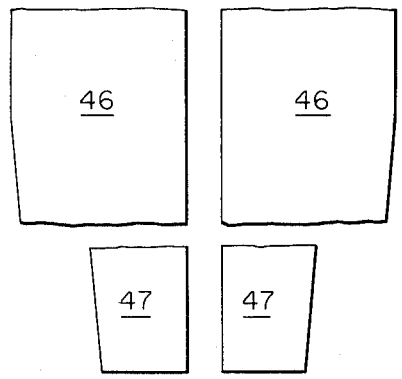
FIG_5
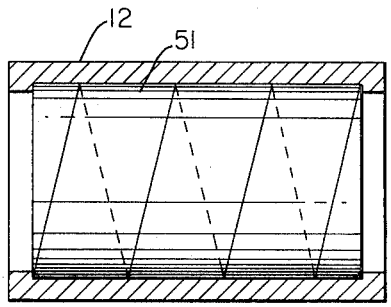
FIG_6
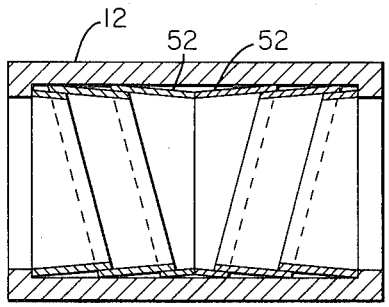
FIG_7
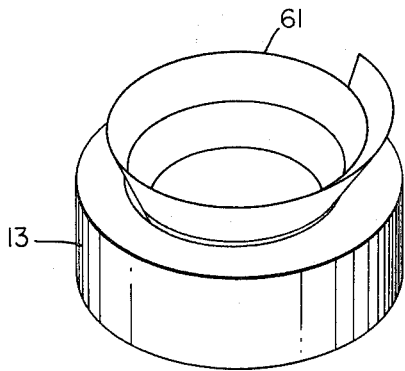
FIG_8
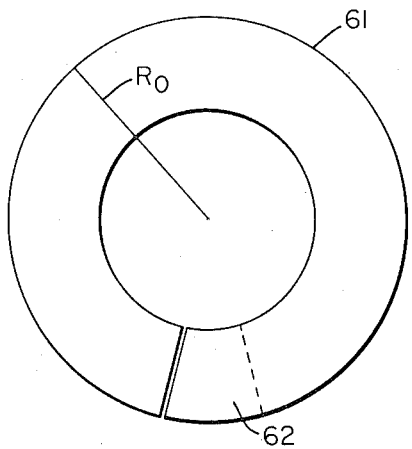
FIG_9

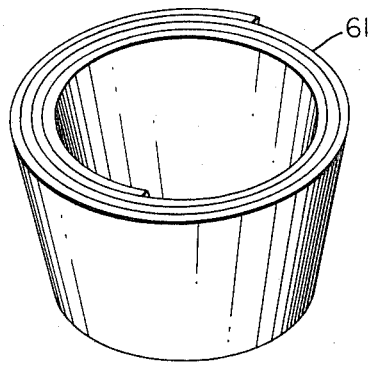
FIG_10
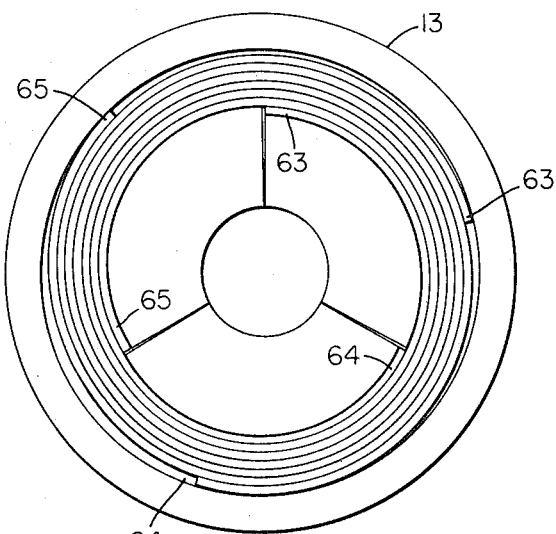
FIG_12
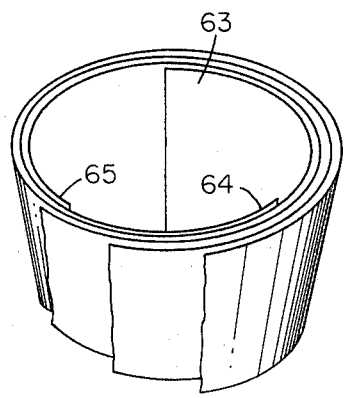
FIG_11
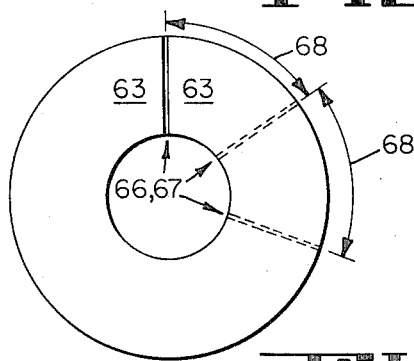
FIG_13
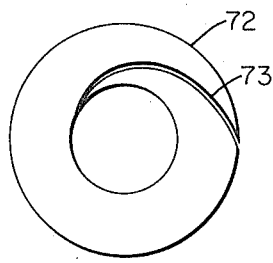
FIG_14
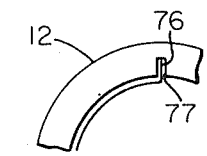
FIG_16
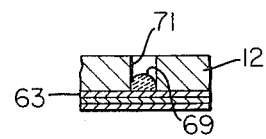
FIG_17
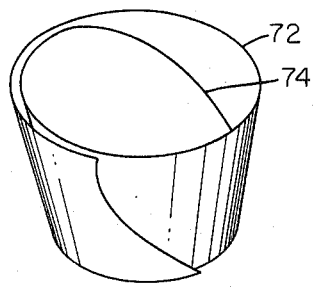
FIG_15
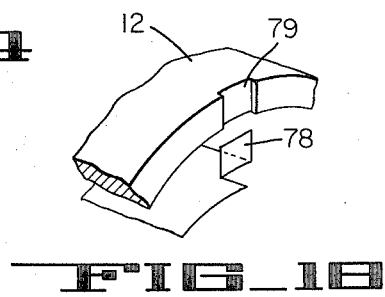
FIG_18
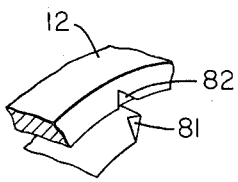
FIG_19

//3,795,427

ANTI-WHIRL FLUID BEARING

BACKGROUND OF THE INVENTION

This invention relates to bearings of the fluid-film, self-acting type, and particularly to such bearings employing foil members to eliminate a tendency to "whirl" and self-destruct.

Much research and development is currently being pursued in efforts to provide the most effective bearings for high speed rotating shafts, especially of the self-acting air bearing class, in which the rotating shaft frictionally draws a film of air into the converging-diverging clearance between the shaft and bearing surfaces, thus pressurizing the air and causing it to act hydrodynamically as a wear-less lubricating pad or cushion for the shaft. An undesirable characteristic of such bearings in elementary form, however, is that at a certain critical speed, the shaft begins to move in an expanding orbit around the axis of the bearing concavity, and with such rapid growth that the protecting air film is eventually overwhelmed, and catastrophic impact of the shaft against the bearing surface occurs, often causing irreversible and irreparable damage to the machine. Furthermore, the elementary form bearing has limited tolerance of thermal and geometrical distortions and misalignments, as well as of particulate matter entering the bearing clearance.

Prior solutions to these problems have involved tensioning metallic or plastic foils in a traingular pattern around the shaft, whereby the air bearing is formed between the shaft and foils and the property of the foil bearing thus formed is to induce correction of incipient whirl conditions and dampen its growth, thus preventing a build-up to dangerous proportions; and the disposition of a number of fairly stiff foil-leaves in a similar supporting pattern around the shaft to produce a similar effect. In the latter type of system, one end of each foil leaf must be secured to the stator framework to keep it in correct angular position; and in both solutions the springiness of the foils is loaded to cause the foils to bear in pressure toward or against the shaft, which condition sometimes causes excessive friction and consequent damage or wear of the shaft and foils during starting and stopping, when the air film is not present. Also the structure associated with such systems is complex and expensive to construct, and must be very delicately and individually adjusted for satisfactory operation.

Accordingly, it is an object of the present invention to provide an anti-whirl bearing, in which the starting and stopping friction is substantially reduced.

It is another object of the invention to provide an anti-whirl bearing of improved simplicity and economy in manufacture, assembly and use.

SUMMARY OF THE INVENTION

These and other objects are provided in structure in which an anti-whirl capability is provided for a shaft and journal bearing, or a conical-ended shaft in a combination journal-thrust bearing, by coiling a springy foil strip in more than one full turn around the shaft within the bearing concavity, the springiness of the coiled strip being such as to cause the coil to expand away from the shaft and against the walls of the concavity in the bearing block.

DESCRIPTION OF THE DRAWINGS

FIG. 1 is a broken-away elevation view of an apparatus employing two interchangeable versions of the invention;

FIG. 2 is an enlarged broken-away view of a portion of FIG. 1;

FIG. 3 is a cross-section view taken on the plane of lines 3—3 of FIG. 2;

FIG. 4 is a broken-away view of an alternative embodiment of a portion of FIG. 2;

FIG. 5 is a broken-away view of the foil of FIG. 4 laid flat;

FIG. 6 is a broken-away view of an alternative embodiment of a portion of FIG. 2;

FIG. 7 is a broken-away view of an alternative embodiment of a portion of FIG. 2;

FIG. 8 is a perspective view of portions of the apparatus of FIG. 1;

FIG. 9 is a reduced plan view of the foil of FIG. 8 laid flat;

FIG. 10 is a perspective view of the apparatus of FIG. 8 in operating disposition;

FIG. 11 is a enlarged broken-away perspective view of an alternative version of FIG. 10;

FIG. 12 is an enlarged elevation view of the apparatus of FIG. 11;

FIG. 13 is a reduced broken-away plan view of the foils of FIGS. 11 and 12 laid flat;

FIG. 14 is a reduced plan view of an alternative version of the foil of FIG. 9 laid flat;

FIG. 15 is an enlarged perspective view of the foil of FIG. 14 in operating disposition;

FIG. 16 is an enlarged detail of a portion of a modified form of foil;

FIG. 17 is an enlarged detail of a portion of a modified form of foil;

FIG. 18 is an enlarged detail of a portion of a modified form of foil; and

FIG. 19 is an enlarged detail of a portion of a modified form of foil.

DETAILED DESCRIPTION OF THE PREFERRED EMBODIMENTS

Referring now to FIG. 1 of the drawings, there is shown a turbine rotor 11 mounted in a pair of interchangeable bearing blocks 12 and 13, which are of different types but still may be used together, and are shown together for economy of illustration. Bearing block 12 is a journal bearing and is supplemented by a thrust bearing 14, while bearing block 13 is a combination thrust and journal bearing of the conical type. Rotor 11 has a number of bucket recesses 16 and is driven by an air jet apparatus 17, comprising a manifold ring through which a number of air-jet holes are angled at the area of buckets 16. The rotor also has right-circular-cylindrical shaft portions 18 at both ends so that two journal bearings 13 may be fitted if desired, and two truncated-conical surfaces 19 just inboard from the portions 18 so that alternatively two journal-thrust bearings 13 may be fitted. The bearing blocks fit interchangeably into brackets 21,22 mounted on base plate 23, and are retained by means of outboard collars 24 and bolts 25,26. The thrust bearing 14 consists of a plate 27 bolted (28) to the collar 24 and provided with an axial air-jet bore 29 coupled to a conduit 31 from a pressurized air supply means (not shown). Air from jet hole 29 forms a pressurized-air lubricating pad between collar 27 and the end of shaft 18.

Bearing block 12, better shown in FIG. 2, has a journal opening 36 tapered outwardly (37) at the inboard side and inwardly flanged (38) at the outboard side so as to retain a multi-turn coil 39 of springy foil loaded so as to tend to expand outwardly against the wall of opening 36 and away from the shaft 18. Thus, the shaft 18 fits relatively loosely within the coil, even though, as shown in FIG. 3, the inner end portion 41 may tend to conform less to the coil shape and form a chord instead of an arc. Such a tendency at the outer end portion 42 is usually suppressed by the springy outward expansion of the coil. The tendency of the foil to form chords and to bear frictionally against the shaft 18 during starting and stopping, when there is no air lubricating films, is thus held to a minimum. Another advantage of the present bearing, when the coil is wound oppositely to the direction of shaft rotation, is that the coil is both radially and rotationally compliant when contacted by the rotating shaft, and the inner end tends to slip in the direction of shaft rotation, contracting the coil and loosening its turns and entrapping more cushioning air between them as it moves.

FIGS. 4 and 5 show a modified form of coil in which a pair of foil halves 46 are first laid flat (FIG. 5) and are then cut to taper at the outboard sides from one end 47, and are then coiled as shown in FIG. 4 with the narrow ends inward. When the shaft (not shown) is then rotated in the same direction as the coil traces from outer to inner ends, the ambient air is pumped axially into the bearing from both ends and a more highly pressurized bearing results. The two foil halves 46 may be combined in one unitary structure if desired.

FIG. 6 illustrates a modified form of the invention in which the foil 51 is coiled in block 12 in a helical rather than spiral form, the adjacent foil edges being abutted to give the coil the thickness of one layer of foil, but the multiple turns being preserved.

FIG. 7 illustrates a modified form of the invention in which the edges of a helically coiled foil 52 are overlapped in block 12 to give the coil envelope the thickness of two layers of foil. The foil is shown formed in oppositely coiled halves to provide a pumping effect as in the version of FIG. 4.

Returning to FIG. 1, it will be seen that the bearing block 13 has a lip 59 for retaining a foil 61 in frustroconical coil shape (shown partly assembled in FIG. 8), which effect is obtainable by cutting the foil strip from a ring-shaped or 360-degree segment annular disc as shown in FIG. 9. If the radius of the conical base of the assembled foil cone is $r_o$, the cone angle is $\alpha$ (FIG. 1), the number of turns desired is $n$, and the outer radius of the stock disc is $R_o$ (FIG. 9), then the relationship of these parameters is:

$$R_o/r_o = n = (\sin \alpha)^{-1}$$

in order to use the least amount of stock. Of course, the number of turns can still be decreased by cutting out a segment, e.g., segment 62 of the segment 61, as shown in FIG. 9.

FIG. 10 shows the foil 61 in coiled form, it being understood that the springiness of the foil causes it to tend to expand outwardly so that it will not remain in the coiled form shown unless retained as by the bearing block 13 and lip 59.

FIG. 11 shows an arrangement of three springy conical foils 63, 64 and 65 interleaved with the inner ends angularly equispaced. FIG. 12 shows the same arrangement retained against outward expansion by block 13, and shows how each of the foils is coiled for about two and a fraction turns from inner to outer end. FIG. 13 illustrates how the three foils may be laid out in flat stock form before coiling, with the abutted inner and outer ends 66, 67 of each 360-degree foil segment spaced angularly for the angle 68 to place them in correct angularly equispaced relation after coiling. Such an arrangement is useful when the three foils are to be fastened together to preserve their angular positional relation, as shown for example in FIG. 17, wherein the outer end of foil 63 is secured to the block 13 by means of a drop of solder or adhesive 69 dropped through a bore 71 formed for that purpose in the block. The foils can similarly be secured each to each.

FIGS. 14 and 15 illustrate how the workpiece ring 72 may be cut on an expanding bias 73 from inner to outer periphery and then coiled to produce a helical edge 74 (FIG. 15) thus to pump air into the bearing when the rotor rotates, e.g., in a clockwise direction as seen from above in FIG. 15.

FIG. 16 illustrates how a single foil may be retained angularly by crimping over the outer end 76 into a recess 77 in the block 12. FIG. 18 illustrates forming a retaining tab 78 in a corner of the foil for retention in a recess 79 of the block 12. FIG. 19 illustrates folding a triangular corner 81 of the foil to form a tab for retention in a recess 82 of the block 12. It has also been found that effective retention against angular displacemnt of the foil can be provided by merely roughening the outward facing end face of the foil as with sandpaper or emery cloth.

Although means for retaining the foil against angular displacement have been described, it has been found in practice that satisfactory performance of the multi-turn coil bearing is achieved even when no retention means are provided.

It has also been found that the bearing operates equally well in both directions of shaft rotation, except with respect to the pumping versions of FIGS. 4, 7 and 15.

Clearly, analogous structure can be provided for bearings in which the rotor member rather than the stator member contains the concavity, without departing from the scope of the appended claims. The loading of the springy foil then would be such as to urge it to contract around and against the stator member.

Thus there has been described an apparatus in which an anti-whirl capability is provided for a shaft and journal bearing, or a conical-ended shaft of the combination journal-thrust bearing type, by coiling a springy foil strip in more than one full turn around the shaft within the bearing concavity, the springiness of the coiled strip being such as to cause the coil to expand away from the shaft and against the walls of the concavity in the bearing block.

In the claims:

1. In combination with a rotating element and a supporting fixed bearing element, one of said elements fitting into a concavity of the other element:
    a flexible foil strip coiled in more than one turn around said other element within said concavity;
    whereby a self-acting fluid bearing is formed between said strip and said elements.

2. The combination of claim 1, wherein said coiled foil strip is springy and is loaded to circumferentially engage said fixed element, and means are provided to retain said coiled strip on said fixed element.

3. The combination of claim 2, wherein said rotating element is a cylindrical shaft and said concavity is defined by a hollow cylindrical wall of said fixed element, said springy foil strip being coiled to expand against said cylindrical wall.

4. The combination of claim 3, wherein said foil strip is tapered in width from a wide outer turn of said coil to a narrow inner turn, and said shaft rotates in the direction traced by said foil from outer to inner turn, so as to define a pump for drawing air into said bearing.

5. The combination of claim 4, wherein said foil strip is provided in mirror image halves of equal length, the confronting foil edges being co-planar and the outwardly facing edges being tapered.

6. The combination of claim 3, wherein said foil strip is arranged in helical form with abutted edges to define a hollow cylinder of wall thickness equal to the foil thickness.

7. The combination of claim 3, wherein said foil strip is arranged in helical form with overlapping edges to define a stepped hollow cylinder of envelope wall thickness equal to twice the foil thickness.

8. The combination of claim 7, wherein said foil strip is formed in two halves with oppositely directed helical forms.

9. The combination of claim 3, wherein said rotating element is a shaft with a frustro-conical end and said concavity is defined by a hollow conical wall in said fixed element.

10. The combination of claim 9, wherein said foil strip is formed from flat stock as a 360-degree circular segment of outer radius $R_o$, the outer radius of the conical base of said conical wall being $r_o$, the cone angle of said conical wall being $\alpha$, and the number of turns of said coil being $n$; and wherein $$R_o/r_o = n = (\sin \alpha)^{-1}.$$

11. The combination of claim 10, wherein said foil strip is reduced in circumferential length by reducing the angle of said circular segment, the number of turns in the completed coil being correspondingly less than $n$.

12. The combination of claim 10 wherein a plurality of circular segments are provided and are interleaved in coil form in said concavity.

13. The combination of claim 10, wherein the ends of said circular segment are cut on an expanding bias curve from the inner circumference to the outer circumference of said segment.

14. The combination of claim 3, wherein the end of said foil remote from said rotating element is secured to the adjacent structure that is more remote from said rotating element.

15. The combination of claim 14, wherein said adjacent structure is provided with an opening into which an adhesive material is inserted to contact and adhere to said foil.

16. The combination of claim 14, wherein said adjacent structure is provided with a recess, a corner of said remote foil end being crimped over to extend into said recess to retain said foil.

17. The combination of claim 14, wherein a plurality of said foils are provided and are interleaved with the ends thereof in angularly equispaced relation.

* * * * *